United States Patent
Walker et al.

(10) Patent No.: US 7,240,021 B1
(45) Date of Patent: *Jul. 3, 2007

(54) SYSTEM AND METHOD FOR TRACKING AND ESTABLISHING A PROGRESSIVE DISCOUNT BASED UPON A CUSTOMER'S VISITS TO A RETAIL ESTABLISHMENT

(75) Inventors: Jay S. Walker, Ridgefield, CT (US); Andrew S. Van Luchene, Norwalk, CT (US); Magdalena Mik, Wallingford, CT (US); John Chuprevich, Southington, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/049,297

(22) Filed: Mar. 27, 1998

(51) Int. Cl.
*G06Q 30/00* (2006.01)
*G07G 1/14* (2006.01)

(52) U.S. Cl. .............................. 705/14; 705/14; 705/16; 705/26; 705/27; 705/41; 235/375; 235/380

(58) Field of Classification Search .................. 705/14, 705/7, 26, 27, 16, 41; 235/375, 380
See application file for complete search history.

(56) References Cited

U.S. PATENT DOCUMENTS

| | | | |
|---|---|---|---|
| 4,567,609 A | | 1/1986 | Metcalf |
| 4,817,166 A | | 3/1989 | Gonzalez |
| 4,878,248 A | | 10/1989 | Shyu et al. |
| 4,908,761 A | | 3/1990 | Tai |
| 4,982,346 A | * | 1/1991 | Girouard et al. .............. 705/14 |

(Continued)

FOREIGN PATENT DOCUMENTS

| | | |
|---|---|---|
| EP | 25754 | 3/1981 |
| WO | WO 96/21192 A1 * | 7/1996 |
| WO | WO 9629668 | 9/1996 |

OTHER PUBLICATIONS

Zimmerman, Denise, "Food Lion Launches Frequent Shopper Plan", Supermarket News, vol. 45, No. 5, Jan. 30, 1995.*
No Author, "Brazilian Companies Sell by Affinity Card", Insurance Industry International, No. 32, Feb. 1995.*
Bagot, Brian, "Brand Report: Service, Please", Abstract, Marketing & Media Decisions, Aug. 1990.*
Bradford, Stacey L., "Food Lion: King of the Jungle?", Financial World, vol. 166, No. 1, Jan. 21, 1997.*

(Continued)

*Primary Examiner*—Bradley B. Bayat
(74) *Attorney, Agent, or Firm*—Michael D. Downs

(57) ABSTRACT

A system and method for rewarding a customer's loyalty to a retail establishment and encouraging regular customer visits by offering a progressive discount on their purchases includes a point of sale (POS) controller that determines a loyal customer's discount. The value of the discount is dependent upon the customer visiting the retail establishment on a regular basis. A customer's visits are tracked, and the customer is provided with a discount that is incremented by a pre-defined value if the customer visits at least once every pre-defined period. The discount may only be incremented once in every pre-defined time period and may be negated if the customer did not visit at all during the pre-defined time period. Coupons that are representative of the discount earned by the customer may also be offered. If the coupon is redeemed within the pre-defined time period, a new coupon is issued having a higher discount value of a pre-defined value. If the coupon is redeemed after the pre-defined time period has expired, the customer receives no discount on the current purchase and is issued a new coupon at a pre-defined minimum discount value.

11 Claims, 18 Drawing Sheets

U.S. PATENT DOCUMENTS

| | | | |
|---|---|---|---|
| 5,056,019 A | * 10/1991 | Schultz et al. | 705/14 |
| 5,081,685 A | 1/1992 | Jones et al. | |
| 5,136,658 A | 8/1992 | Mori | |
| 5,315,664 A | 5/1994 | Kumagai | |
| 5,327,508 A | * 7/1994 | Deaton et al. | 705/14 |
| 5,380,991 A | * 1/1995 | Valencia et al. | 705/14 |
| 5,388,165 A | 2/1995 | Deaton | |
| 5,448,471 A | 9/1995 | Deaton | |
| 5,459,306 A | 10/1995 | Stein | |
| 5,537,314 A | * 7/1996 | Kanter | 705/14 |
| 5,568,406 A | 10/1996 | Gerber | |
| 5,638,457 A | 6/1997 | Deaton | |
| 5,687,322 A | * 11/1997 | Deaton et al. | 705/14 |
| 5,689,100 A | 11/1997 | Carrithers | |
| 5,710,557 A | 1/1998 | Schuette | |
| 5,745,052 A | 4/1998 | Matsuyama | |
| 5,774,870 A | * 6/1998 | Storey | 705/14 |
| 5,832,457 A | * 11/1998 | O'Brien et al. | 705/14 |
| 6,076,068 A | 6/2000 | DeLapa et al. | 705/14 |
| 6,415,261 B1 | * 7/2002 | Cybul et al. | 705/14 |

OTHER PUBLICATIONS

Casper, Carol, "Restaurants Seek Loyal Customers", Information Access Company, May 1994, vol. 6; No. 5; p. 18.

"Stop & Shop Debuts Mastercard", Information Access Company, Oct. 23, 1995 No. 44 vol. 2.

Marriott, Anne "A Credit Deal—Or Not?,Co–Branded Cards' Offers Raise Takers, Debts", The Washington Times, Jul. 17, 1996 at p. B7.

Cross, Richard, "The Customer Value Chain",, American Demographics, Inc.,Marketing Tools, Jan./Feb. 1997 p. 14.

Purpura, Linda "Green Hills Farms Finding Gold in Frequent—Shopper Cards.", Supermarket News, Feb. 24, 1997at Sec. No. 8, vol. 47; p. 19.

Gilligan, Gregory J. Gilligan, "Ukrop's Branches into Finance; for the Chain's CEO, This Was a Deal That Was Too Good to Miss" The Richmond Times Dispatch, Apr. 27, 1997.

Bowie, Liz "Food Lion Looks Toward Baltimore: Area a 'Growth Market' to Chain; 20–25 Stores May Come, Sources Say; Company Keeping Quiet; No–Frills Retailer Poses Compettion for Region Leader Giant", The Baltimore Sun, Company Apr. 28, 1997 p. 11c.

Stoneback, Diane, "It's in the Cards; Supermarkets Deal Savings to Their Best Shoppers", The Morning Call, Jun. 18, 1997 p. D1.

"A & P/Dominion Joins Air Miles (R) Reward Program", Canada Newswire Aug. 21, 1997.

Purpura, Linda "The Great Equalizer: When it Comes to Customer–Loyalty Programs, Quick Reactions to Incoming Data Give Independent Retailers a Competitive Advantage", The Supermarket News, Sep. 1, 1997 Sec. No. 35, vol. 47; p. 17.

Appel, Ted "Smart Coupons Customers Save Big, Stores Track Spending with Discount Cards", The Press Democrat, Oct. 5, 1997 p. E1.

Blackwell, Richard "Get Club Z Points for Shopping CIBC",The Financial Post, Oct. 9, 1997 Sec. 1. p. 17.

Bird, Anat, "Super Community Banking: Sharpen Strategy to KeepYour Bank's Most Profitable Customers for Long Haul" The American Banker, Dec. 3, 1997, p. 4.

"Here Come the Canadian Marketers", Credit Card Management, Jan. 1998.

Smith, Rebecca "Buy More, Pay Less; Frequent Shopper Programs Promise a Brave New World in Grocery Buying", Pittsburgh Post–Gazette, Jan. 19, 1998, p. E–1.

"CIBC Club Z Visa Card" (http://www.cibc.com), download date Feb. 1, 1998.

"Your Rewards On–Line", Club Z (http://www.hbc.com/clubz), download date Feb. 1, 1998.

"Frequent Shopper Programs Are Used By 14% of All Supermarkets" (http://www.retailtech.com/archive/frequent.htm), download date Feb. 1, 1998.

"Turbocharging Your Customer–Loyalty Programs" (http://retailtech.com/archive/turbocha.htm) download date Feb. 1, 1998.

Amato–McCoy, Deena, "Co–Branded Acme Credit Card Rewards Loyal Users", Supermarket News, Jun. 15, 1998 at p. 17.

"A CME Markets, U.S. Bancorp Debut Rewards Card", Card News, Jun. 22, 1998 vol. 13, No. 12.

Myhre, James W., "Examiner's Affidavit", dated Feb. 22, 2001.

* cited by examiner

| ACCOUNT NUMBER 164 | CUSTOMER NAME 166 | CUSTOMER ADDRESS 168 | CUSTOMER TELEPHONE NUMBER 170 | EARNED DISCOUNT 172 | LAST USED 174 |
|---|---|---|---|---|---|
| 1234567 | JOE SMITH | 42 SILVER ST. TOWN, CT 55555 | (203)555-7890 | 3.5% | 1/27/98 2:43 PM |
| 1234568 | JANE DOE | 1578 MAIN ST. CITY, CT 66666 | (203)111-0987 | 0.5% | 1/15/98 7:19 AM |
| 1234569 | JOHN JONES | 183 BROAD ST. VILLAGE, CT 77777 | (203)222-9081 | 1.0% | 1/22/98 12:30 PM |

| ACCOUNT NUMBER 164 | CUSTOMER NAME 166 | CUSTOMER ADDRESS 168 | CUSTOMER TELEPHONE NUMBER 170 | EARNED DISCOUNT 172 | LAST USED 174 | DISCOUNT ITEMS 178 |
|---|---|---|---|---|---|---|
| 1234567 | JOE SMITH | 42 SILVER ST. TOWN, CT 55555 | (203)555-7890 | 3.5% | 1/27/98 2:43 PM | 01200002953 DIET PEPSI |
| 1234568 | JANE DOE | 1578 MAIN ST. CITY, CT 66666 | (203)111-0987 | 0.5% | 1/15/98 7:19 AM | N/A |
| 1234569 | JOHN JONES | 183 BROAD ST. VILLAGE, CT 77777 | (203)222-9081 | 1.0% | 1/22/98 12:30 PM | 04301103514 CHARMIN |

| ACCOUNT NUMBER 164 | CUSTOMER NAME 166 | CUSTOMER ADDRESS 168 | CUSTOMER TELEPHONE NUMBER 170 | EARNED DISCOUNT 172 | LAST USED 174 | DISCOUNT UPDATED 182 |
|---|---|---|---|---|---|---|
| 1234567 | JOE SMITH | 42 SILVER ST. TOWN, CT 55555 | (203)555-7890 | 3.5% | 1/27/98 2:43 PM | 1/14/98 8:21 PM |
| 1234568 | JANE DOE | 1578 MAIN ST. CITY, CT 66666 | (203)111-0987 | 0.5% | 1/15/98 7:19 AM | 1/13/98 11:33 AM |
| 1234569 | JOHN JONES | 183 BROAD ST. VILLAGE, CT 77777 | (203)222-9081 | 1.0% | 1/22/98 12:30 PM | 1/20/98 2:40 PM |

| RECORD IDENTIFIER 190 | EARNED DISCOUNT 192 | ISSUE DATE 194 | TOTAL # ISSUED 196 | TOTAL # REDEEMED 198 | REDEEM DATE 1 200 | REDEEM DATE 2 202 | REDEEM DATE N 204 |
|---|---|---|---|---|---|---|---|
| 1 | 0.5% | 1/1/98 | 32 | 14 | 3 | 11 | 0 |
| 2 | 1.0% | 1/1/98 | 98 | 37 | 4 | 49 | 18 |
| 3 | 1.5% | 1/1/98 | 73 | 68 | 42 | 21 | 1 |
| 4 | 2.0% | 1/1/98 | 117 | 44 | 18 | 3 | 9 |
| 5 | 0.5% | 1/2/98 | 56 | 16 | 4 | 1 | 3 |
| 6 | 1.0% | 1/2/98 | 79 | 37 | 7 | 22 | 1 |

FIG. 11

SYSTEM AND METHOD FOR TRACKING AND ESTABLISHING A PROGRESSIVE DISCOUNT BASED UPON A CUSTOMER'S VISITS TO A RETAIL ESTABLISHMENT

BACKGROUND OF THE INVENTION

1. Field of the Invention

The present invention relates to frequent shopper systems and more particularly, to frequent shopper systems that reward loyal customers with increasing discounts for regularly visiting a retail establishment.

2. Description of the Related Art

The grocery store industry is a lucrative and highly competitive one. There are approximately 75 large supermarket chains in the United States. The large variety of supermarket chains provides many choices from which to choose from, thus forcing each supermarket chain to aggressively pursue marketing strategies to attract customers and induce customer loyalty to their chain. In an attempt to attract consumers, the grocery store industry has employed a number of different promotions. Despite the supermarkets efforts, customer loyalty is no longer inherent due to the increased competition.

The conventional methods of attracting and developing customer loyalty used by a supermarket chain include television and radio advertising to promote their stores. In addition, some stores offer free standing inserts (FSIs), coupons, and loss leaders in order to attract consumers. These strategies, however, erode the gross margin without retaining the stores best customers. Furthermore, weekly advertised specials and coupons by their very nature only attract customers for a given time period. Since the specials or discounts vary from week to week, there is no guarantee or likelihood that a store will be discounting exactly what the consumer is interested in buying every grocery trip. Most consumers, therefore, scan the weekly advertisement of every grocery store in their area before doing their weekly grocery shopping and choose to go to the store that most meets their needs.

Many supermarket chains also have established "superstores" to provide increased convenience for the customers with at least the intent to attract more consumers. These superstores attempt to provide one-stop shopping for consumers by providing a greater variety of goods and services typically not found in conventional supermarkets, such as bakeries, video rental, banking services, automotive parts and recreational equipment. The advantage that these superstores have to attract customers, however, has been tempered by the increased popularity of these type of stores among the different supermarket chains.

Another attempt to attract customers is the implementation of a frequent shopper card program. This program provides a customer with a frequent shopper card that is presented at the time of purchase. Presentation of the card enables the customer to receive special weekly discounts on specific items purchased. Essentially, these programs act as a paperless coupon redemption system.

The frequent shopper card programs are also used to track a customer's shopping habits. The frequent shopper card includes a customer identifier that enables the retailer to identify, record and track a frequent shopper's purchases. The customer's shopping history is then used to perform targeted marketing functions, such as compiling mailing lists and sending out advertising material or printing out point-of-sale (POS) coupons to the customer.

While the frequent shopper card program may succeed in attracting the consumer to the store on an occasional basis, the program does not successfully ensure the loyalty of the consumers. Since most stores have a frequent shopper card program, consumers simply acquire one of these cards for every chain in their area and go to the one that offers the better specials on any particular week or is the most convenient at any given time. The program does not provide any incentive (i.e., reward or penalty) for visiting the store on a consistent basis.

With the considerable number of supermarket stores in any given area, there exists a need for systems and processes which provide a supermarket the ability to reward a customer for consistent patronage to the supermarket and to promote and reinforce the customer's loyalty.

SUMMARY OF THE INVENTION

It is a principle object of the present invention to provide new and improved systems and methods for retail establishments to reward customer loyalty and encourage a regular frequency of consumer visits by offering a progressive discount on their purchase.

In accordance with the present invention, a system for determining a discount for a customer of a retail establishment comprises an input device and a signal processing system. The input device generates an identifier signal indicative of a customer's identification, and the signal processing system is responsive to the identifier signal. The signal processing system has memory that stores a program. The program directs the processing system to calculate a second discount based on a first discount and a predefined time period defined by a date of a last visit of the customer to the retail establishment.

BRIEF DESCRIPTION OF THE DRAWINGS

The present invention is described in detail below with reference to the following drawing figures of which:

FIG. 4 is an illustration of a database table referred to as the FREQUENT SHOPPER CARD database in FIG. 3;

FIG. 7 is an illustration of another embodiment of a database table referred to as the FREQUENT SHOPPER CARD database in FIG. 3;

FIG. 8 is an illustration of another embodiment of a database table referred to as the FREQUENT SHOPPER CARD database in FIG. 3;

FIG. 11 is an illustration of a database table referred to as the COUPON DISCOUNT database in FIG. 10;

DETAILED DESCRIPTION OF THE PREFERRED EMBODIMENTS

Figure 1:
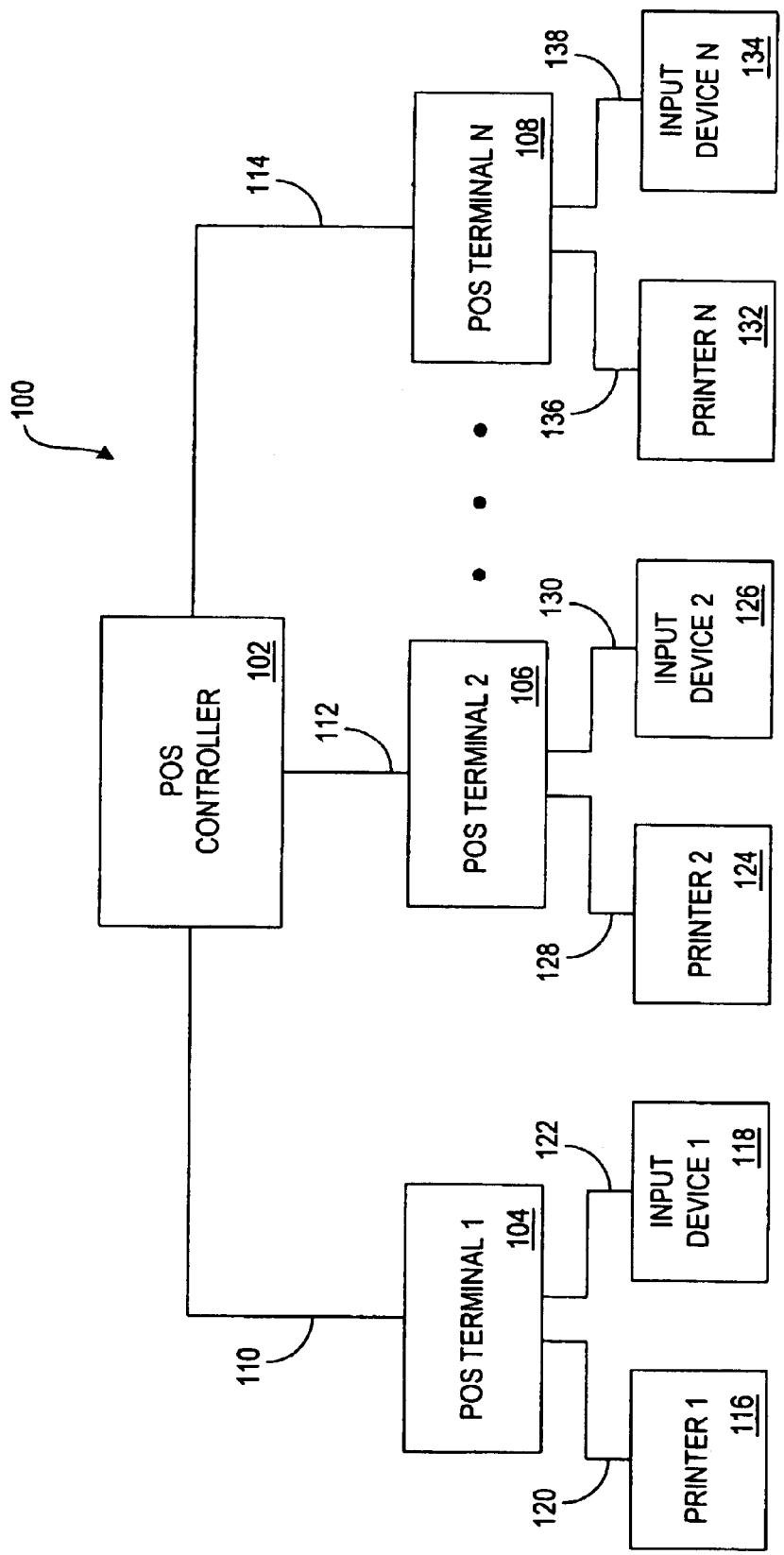
FIG. 1 is a block diagram of a progressive discount system provided in accordance with the present invention.

In accordance with the present invention, there are provided new and improved systems and methods that enable stores to keep track of the consumer's visits via their frequent shopper card and provide them with a discount that is incremented by a pre-defined amount if the customer visits at least once in every pre-defined time period. The discount may only be incremented once in every pre-defined time period and would be negated if the consumer did not visit at all during the pre-defined time period.

In this section, the present invention is described with regard to the drawing figures briefly described above.

As such, the following terms are used throughout the remainder of this section. For purposes of construction, such terms shall have the following meanings:

The terms "item", "product", "goods", and "services", unless otherwise specified, are intended to refer to anything sold or offered by a retailer. Accordingly, for purposes of construction, the terms "item", "product", "goods" or "services" shall be treated as synonyms.

The terms "store", "retailer", "supermarket", and "retail establishment", unless otherwise specified, are intended to refer to any entity that allows customers to purchase products. Retail establishments may be, for example, a retail store such as a warehouse, a supermarket or grocery store, a department store, or any other retail or merchandising establishment. Accordingly, for purposes of construction, the terms "store", "retailer", "supermarket", and "retail establishment" shall be treated as synonyms.

The terms "customer", "consumer" and "shopper", unless otherwise specified, are intended to refer to any person, group of people, or other entity that visits or otherwise patronizes a retailer and who purchases products from the retailer.

The term "purchase", unless otherwise specified, is intended to refer to any product or group of products that a customer buys from a retail establishment during a visit.

The aforementioned and defined terms are used below to describe the preferred embodiments of the present invention. Where appropriate, like terms are referred to with like reference numerals.

The following paragraphs illustrate the structural and operational aspects of the present invention. The structural aspects are illustrated first and are followed by discussions of the operational aspects.

In terms of structure, reference is now made to FIG. 1. Therein depicted is a block diagram representing a purchasing system 100 for a retail establishment equipped to record and tally a customer's transaction, apply an appropriate discount to the customer's transaction, and determine the customer's discount in accordance with the customer's last visit. The purchasing system includes a point of sale (POS) controller 102 and a plurality of POS terminals (i.e., POS terminal 1 104, POS terminal 2 106 and POS terminal N 108). POS terminal N 108 is intended to indicate that purchasing system 100 may include any number of POS terminals. Each POS terminal is in communication with the POS controller 102 via a respective data link such as data link 110, data link 112 and data link 114.

In addition, each POS terminal also communicates with a printer and an input device. As shown in FIG. 1, printer 1 116 and input device 1 118 are coupled to POS terminal 1 104 via data links 120, 122, respectively. Printer 2 124 and input device 2 126 are coupled to POS terminal 2 106 via data links 128, 130, respectively. Printer N 132 and input device N 134 are coupled to POS terminal N 108 via data links 136, 138, respectively. Printer N 132 and input device N 134 are intended to indicate that the purchasing system may include any number of printers and input devices. Each POS terminal and associated printer and input device are substantially the same and therefore, POS terminal 1 104, printer 1 116 and input device 1 118 are described with the understanding that the other POS terminals 106, 108, printers 124, 132 and input devices 126, 134 are the same.

A link such as link 110 preferably comprises a network connection and/or a serial connection between POS terminal 1 104 and POS controller 102. For example, link 110 may be a 10BaseT connection enabling communications between POS terminal 1 104 and POS controller 102. Of course, many other forms of communication links may be incorporated into the actual implementation for the present invention. Such other data links may include network connections, wireless connections, radio based communications, telephony based communications, and other network-based communications such as via wide area networks distributed via open architectures such as by the Internet.

Figure 2:
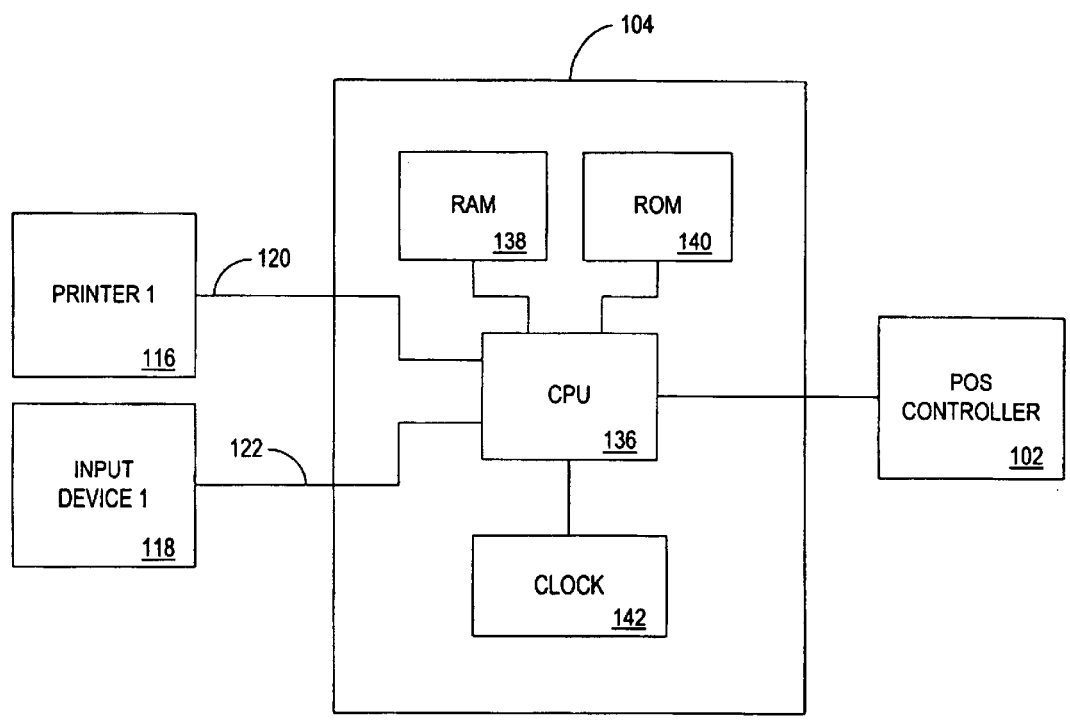
FIG. 2 is a block diagram of a point-of-sale (POS) terminal configured in accordance with a preferred embodiment of the present invention.

Referring now to FIG. 2, POS terminal 104 is a data processing system including a central processing unit (CPU) 136, a random access memory unit (RAM) 138, a read-only memory unit (ROM) 140, and an internal clock 142. The POS terminal 104 is adapted to receive data signals from the input device and process the information in combination with data signals received from the POS controller 102 via link 110.

Input device 118 generates signals that identify the item being purchased and the identity of the customer. Input device 118 may be an optical scanning device similar to the type found in grocery stores. These scanning devices are capable of reading a coded UPC bar code provided on the item to be purchased and a coded UPC bar code provided on a customer's Frequent Shopper Card (not shown) which provides the identity or account number of the customer. The scanning device transmits this coded information to POS terminal 104.

In addition the input device may be adapted to read information stored in a magnetic storage medium (i.e., a magnetic strip) or a smart card having an integrated circuit containing erasable memory.

CPU 136 transmits data across link 110 representative of the items being purchased to the POS controller 102 to determine the price of the scanned item. POS terminal 104 receives the price of the item from the POS controller and transmits data of the name and price of each item to printer 116 via data link 120. Upon receipt of such data, printer 116 prints the information to generate the customer's sales receipt of the transaction. In addition, POS terminal 104 maintains a subtotal of the transaction as each purchased item is scanned through input device 118. After the discount is determined by the POS controller 102, according to the present invention, the POS controller 102 deducts the discount from the subtotal and any applicable taxes are then added to generate a total purchase amount for the transaction. The POS terminal 104 receives this information and transfers the data to printer 116 for printing on the receipt that may include the item purchased, item price, manufacturer's coupon discount, time/date, subtotal of purchase, applicable taxes, progressive discount, total of purchase.

In accordance with the present invention, POS terminal 104 also transmits an identifier or account number of the customer to the POS controller 102, which determines the amount of the discount in accordance with a discount application program and provides the discount amount to the POS terminal 104. POS terminal 104 completes the transaction and transmits data representative of the subtotal of the transaction, the discount, applicable taxes and the final total of the transaction to printer 116 for printing on the receipt.

Figure 3:
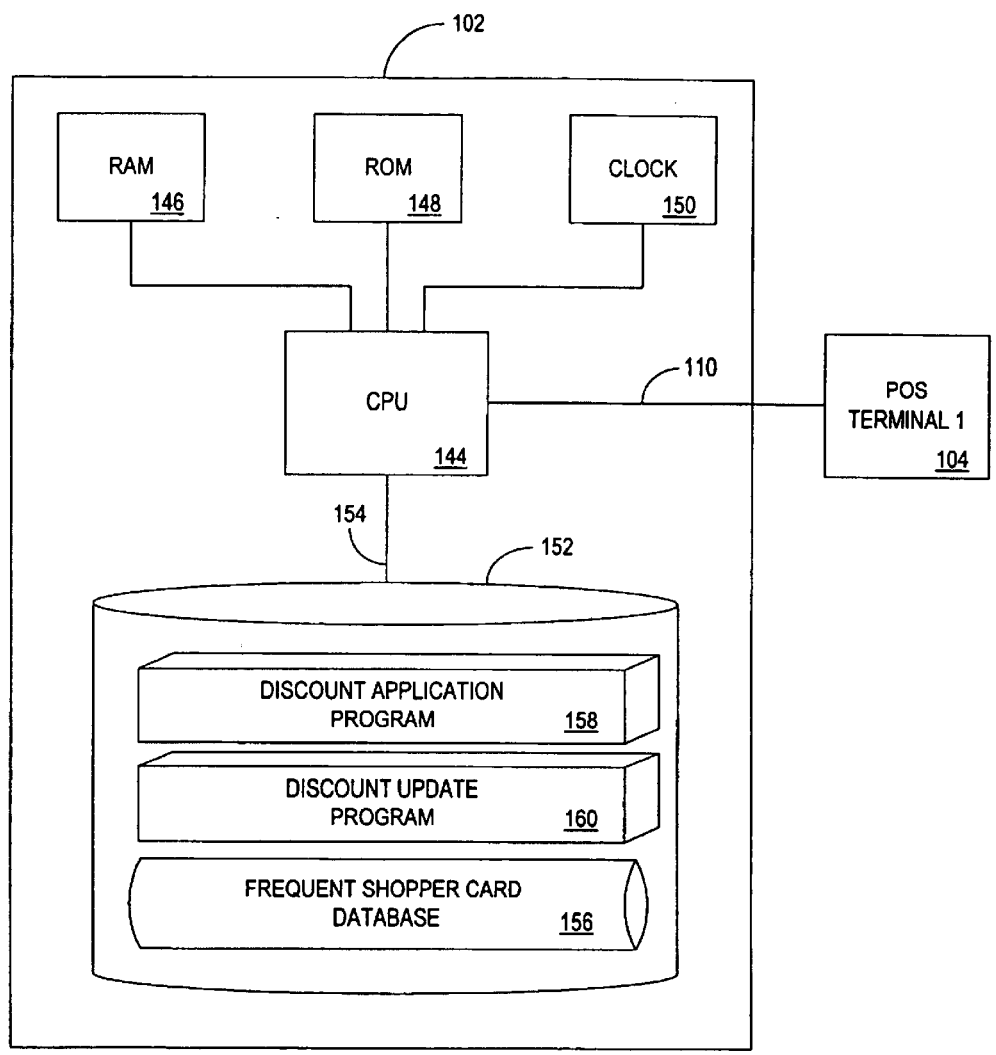
FIG. 3 is a block diagram of a point-of-sale (POS) controller configured in accordance with a preferred embodiment of the present invention.

Referring to FIG. 3, therein depicted is a block diagram of POS controller 102 as originally depicted in FIG. 1. The POS controller 102 is a data processing system such as a computer-equipped automatic data processing system including a central processing unit (CPU) 144, a random access memory unit (RAM) 146, a read-only memory unit (ROM) 148, a clock 150, and a data storage device 152. The CPU 144 communicates with POS terminal 104 via data link 110.

CPU 144 is coupled to the data storage device 152 via a bus 154 or other well-known, high-speed data communications vehicle or channel. CPU 144 is a computer system of the typical variety adapted to run software programs. Additionally, CPU 144 is configured with communications equipment such as telephony communications and network communications equipment to communicate with POS terminals such as POS terminal 104.

Data storage device 152 is an appropriate combination magnetic, semiconductor and/or optical memory. Of course, it will be appreciated that data storage device 152 may be one that consists of multiple disk sub-systems, possibly dispersed geographically and coupled via a network architecture. There is no requirement that data storage sub-system be maintained in one facility; to the contrary, the volume of information stored therein may dictate geographical dispersion. Data storage device 152 need only be logically addressable as a consolidated data source across a distributed environment, such as a network system. The implementation of local and wide-area database management systems to achieve the functionality of data storage device 152 will be readily understood by those skilled in the art.

As noted above, CPU 144 and data storage device 152 are coupled together in a conventional way via communications link 154. Communications link 154 may be a bus or network architecture as indicated above. Communications link 154 will be readily understood by those skilled in the art.

The data storage device 152 stores a FREQUENT SHOPPER CARD DATABASE 156, a DISCOUNT APPLICATION PROGRAM 158, and DISCOUNT UPDATE PROGRAM 160. The FREQUENT SHOPPER CARD DATABASE 156 maintains a record for each customer including information relating to the customers earned discount and the customer's last visit to the retail establishment. CPU 144, in accordance with the DISCOUNT APPLICATION PROGRAM 158, retrieves the earned discount from the customer's record in the FREQUENT SHOPPER CARD DATABASE 156 and applies the earned discount to the customer's current transaction. CPU 144 also, in accordance with the DISCOUNT APPLICATION PROGRAM, records the time and date of the current transaction in the customer's record stored in the FREQUENT SHOPPER CARD DATABASE 156.

At pre-defined time periods (e.g. every two weeks), CPU 144, in accordance with DISCOUNT UPDATE PROGRAM 160, reviews each customer's record in the FREQUENT SHOPPER CARD DATABASE 156 and updates the earned discounts accordingly. If a customer has visited the store within the pre-defined time period, the customers discount is increased by a pre-defined amount (e.g. 0.5%). If not, the customer's earned discount is reset to zero. For example, the earned discounts for each record in the FREQUENT SHOPPER CARD DATABASE 156 were updated on Jan. 1, 1998 and Jan. 15, 1998 (assuming a two week pre-defined time period). If a frequent shopper visited the store during this time (i.e., Jan. 10, 1998), the customer's earned discount is incremented accordingly. If not (i.e., Dec. 25, 1998), the earned discount is reset to zero.

The following paragraphs describe a preferred embodiment of the FREQUENT SHOPPER CARD DATABASE 156 as depicted in database table 162, shown in FIG. 4, that is used in the present invention to record the last visit of a customer to a retail establishment and provide an earned discount to the customer's present transaction. Of course, many changes and alterations may be made to such tables to effectuate certain functionality depending on particular design and implementation details. Such changes and alterations will be apparent to those skilled in the art.

Referring now to FIG. 4, therein is a database table 162 for storing records relating to a customer's loyalty to a particular establishment that maintains a progressive discount system that manages such data. Database 162 (hereinafter referred to as "table 162") is a preferred implementation of FREQUENT SHOPPER CARD DATABASE 156 as originally illustrated in FIG. 3. Table 162 has a column and row arrangement whereby columns define fields and rows define records R1–R3 stored according to the fields defined by the columns. In table 162 there are six columns. Such columns store data related to ACCOUNT NUMBER 164, CUSTOMER NAME 166, CUSTOMER ADDRESS 168, CUSTOMER TELEPHONE NUMBER 170, EARNED DISCOUNT 172, and LAST USED 174. In table 162 record R1 contains information related to an earned discount assigned to a shopper having an ACCOUNT NUMBER of 1234567 among other specified data.

Each record R1–R3 is representative of each customer that has a Frequent Shopper Card account at the retail establishment. Each record R1–R3 maintains the customers present earned discount, in the EARNED DISCOUNT field 172, and the date and time the customer last purchased goods at the retail establishment in the LAST USED field 174. For example, with regard to record R1, Joe Smith having an ACCOUNT NUMBER of 1234567 presently has an EARNED DISCOUNT of 3.5% and his last purchase at the retail establishment was at 2:43 pm on Jan. 27, 1998. Accordingly, Joe Smith will receive a 3.5% discount of his next purchase provided his next purchase is prior to the next update of table 162.

Records R2–R3 have the same record format as record R1 and indicates similar information related to other customers that are identified as frequent shoppers. Accordingly, for purposes of brevity, a detailed review and discussion of records R2–R3 are omitted.

It is important to note that the structure and arrangement of table 162, including its columns and fields, may change to suit particular design requirements. Many columns may be added to table 162 to carry out certain functionality control within a data processing system employing a database table like table 162. Such additions and changes will be apparent to those skilled in the art.

The aforementioned discussions were concerned with the structural aspects of a preferred embodiment and corresponding components of the present invention. Accordingly, it should be understood that the POS controller 102 and POS terminals 104, 106, 108 of purchasing system 100 shown in FIGS. 1–3 and the database table 156 illustrated in FIG. 4 have been designed to operate and function together. The flowcharts depicted in FIGS. 5 and 6 and described below, illustrate how such structures operate together. In particular, described below are the steps carried out by purchasing system 100 within a retail establishment to discount a customer's transaction by a pre-defined percentage and to periodically update the customer's earned discount.

Figure 5:
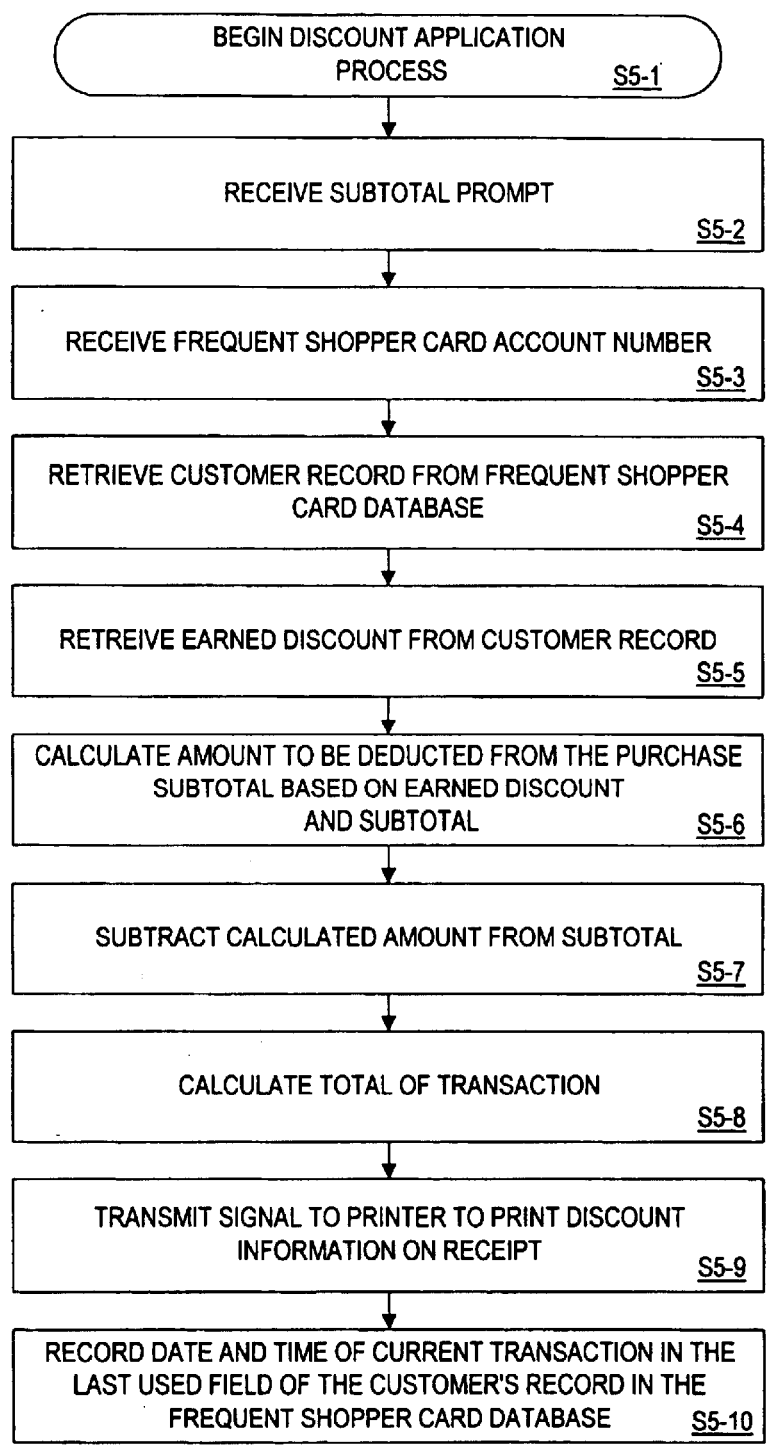
FIG. 5 is a flowchart that illustrates the operations carried out for determining and applying an earned discount to a customer's current purchase according to a preferred embodiment of the present invention.

With the aforementioned comments in mind, reference is now made to FIG. 5. Depicted therein is a flowchart that illustrates the steps of a preferred process performed by a data processing system, such as purchasing system 100, for identifying a frequent shopper and applying the appropriate earned discount to the shopper's transaction. The computer programming necessary to carry out many of the functions stated below will be readily apparent to those skilled in the art of computer programming and will not require undue design and implementation effort. The flow charts of FIGS. 5 and 6 along with the discussions of the same found herein are sufficient and adequate to enable one skilled in the art to make and use the present invention.

Processing starts at Step S5-1 and proceeds to Steps S5-2 and S5-3 where the POS controller 102 receives the account number encoded on the Frequent Shopper Card and the subtotal of the current customer's transaction from POS terminal 104, respectively. As described above, the customer's Frequent Shopper Card, having a UPC coded information, is swiped through input device 118 which scans the encoded information on the card, including the customer's account number. The encoded information is transmitted to POS terminal 104 and provided to the POS controller 102 accordingly.

Thereafter, processing proceeds to Step S5-4, where CPU 144 retrieves the customer record R1, identified by the account number in field 164 of the FREQUENT SHOPPER CARD DATABASE 156.

At Step S5-5, CPU 144 retrieves the discount percentage from the EARNED DISCOUNT field 172 of the customer's record R1. At Step S5-6, the dollar amount of the discount is calculated by multiplying the percentage of the earned discount and the subtotal of the current purchase. At Step S5-7, the dollar amount of the discount is subtracted from subtotal of the purchase and, at Step S5-8, the final total of the transaction is calculated, for example by adding any applicable taxes to the discounted subtotal calculated in Step S5-7.

At Step S5-9, POS terminal 104 transmits a signal to printer 116 which prints information relating to the discount of the customer's transaction onto the sales receipt. This information may include the amount of the discount, the discounted subtotal, applicable taxes and final total of the transaction.

At Step S5-10, CPU 144 updates the LAST USED field 174 of the customer's record in the FREQUENT SHOPPER CARD DATABASE 156, as shown in database table 162 of FIG. 4, to include the current time and date provided by the internal time clock 150.

It should be noted that while CPU 144 updates the LAST USED field 172 of the customer's record R1 for every visit, the present invention contemplates the concept of applying a weight to each visit in order to determine whether the visit to the retail establishment is sufficient to be deemed a "true" visit. A "true" visit is defined as a visit that the retail establishment considers to be representative of a loyal customer, not a visit by one who occasionally frequents the retail establishment to purchase a few items. For example, the discount system would not recognize a purchase of less than a pre-defined dollar amount (i.e., ten (10) dollars) as a "true" visit to the retail establishment. As a consequence, the LAST USED field 174 of the database table 162 is not updated with the date of the current transaction, and therefore may result in the customer's earned discount being reset if this visit is the customer's only visit to the retail establishment within the pre-defined time period.

The concept of applying a weight to a customer's visit may also be used in determining whether a customer's transaction is discounted. For example, the discount system would not discount the current transaction unless the subtotal of the purchase is at least a pre-defined dollar amount (i.e., ten (10) dollars).

Accordingly, the operations carried out in FIG. 5 illustrates steps for discounting a loyal customer's purchase in accordance with the discount earned by the customer.

Figure 6:
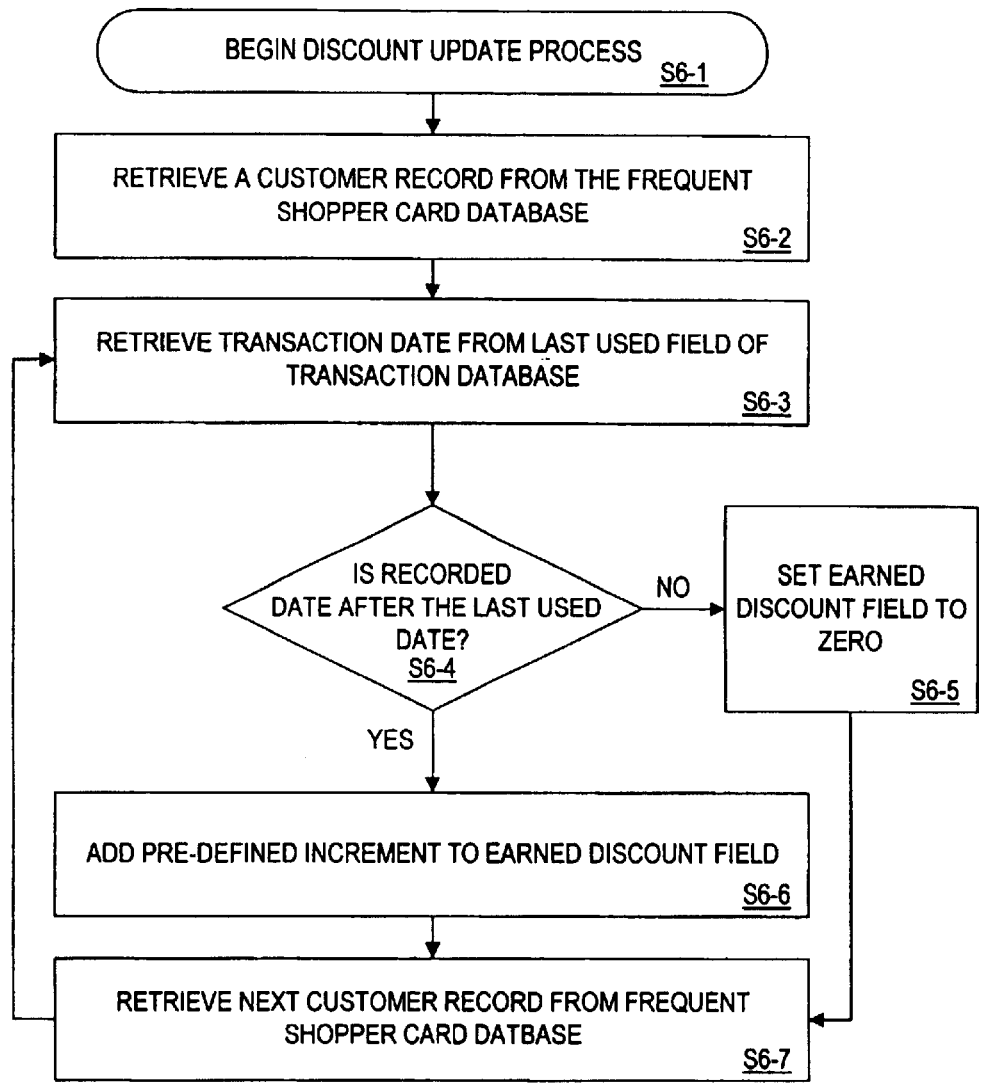
FIG. 6 is a flowchart that illustrates the operations carried out for updating the earned discount of the customers'records stored in the FREQUENT SHOPPER CARD database according to a preferred embodiment of the present invention.

Reference is now made to FIG. 6. Depicted is a flowchart that illustrates the steps of a preferred process performed by a data processing system, such as purchasing system 100, for updating the EARNED DISCOUNT field 172 of each record R1–R3 of the FREQUENT SHOPPER CARD DATABASE 156 in accordance with the last date, stored in the LAST USED field 174, that each respective customers has made a purchase at the retail establishment. The retail establishment executes this process at pre-defined time periods (i.e. every two weeks). One will recognize that this time period may be set for any desired length of time, however, the time period should be representative of the typical frequency that a loyal customer would visit the retail establishment. The computer programming necessary to carry out many of the functions stated below will be readily apparent to those skilled in the art of computer programming and will not require undue design and implementation effort.

Processing starts at Step S6-1 and immediately proceeds to Step S6-2 where CPU 144 of the POS controller 102 retrieves a customer record from the FREQUENT SHOPPER CARD DATABASE 156 depicted in database table 162 of FIG. 4. In Step S6-3 the POS controller 102 retrieves the transaction date from the LAST USED field 174 of the retrieved customer record R1.

Thereafter, processing proceeds to Step S6-4, where CPU 144 compares the last transaction date of the customer stored in the LAST USED field 174 with the date of the previous update of the records of the FREQUENT SHOPPER CARD DATABASE 156. In other words, the previous update corresponds to the date that the DISCOUNT UPDATE PROGRAM 160 was last executed. If the customer's last transaction date was before the previous update of the FREQUENT SHOPPER CARD DATABASE 156, the EARNED DISCOUNT field 172, at Step S6-5, is set to zero percent. The harshness of resetting the earned discount to zero percent is intended to provide greater incentive for the customer to visit the retail establishment on a regular basis. This harshness may be tempered by reducing the earned discount in accordance with any number of criteria. For example, the earned discount may be decreased by a pre-defined value each time the customer fails to visit the store within the pre-defined time period. Alternatively, the updating process may not penalize the customer after a first instance in which the customer fails to visit the retail establishment in the pre-defined period, but instead postpone the penalty for a subsequent failure. This alternative may be used to prevent a loyal customer who, for instance, may have been away on vacation from being penalized. As one skilled in the art will appreciate that the penalty for not visiting the retail establishment may be determined in a number of different ways.

If, at Step S6-4, the customer's last transaction was after the previous update of the FREQUENT SHOPPER CARD DATABASE 156, the EARNED DISCOUNT field 172, at Step S6-6, is incremented by a pre-defined percentage value (i.e., 0.5%). For example, if the present earned discount is 2.0 percent, the earned discount is incremented to 2.5 percent (assuming the percentage value increment is 0.5%). The earned discount that can be earned by any frequent customer may be limited to a pre-defined percent, such as 5.0%. Once the earned discount has achieved this maximum discount value, the earned discount field will not be incremented and will, at best, remain at the maximum discount value.

At Step S6-7, after the earned discount of a customer's record is updated, CPU 144 retrieves the next customer record R2 from the FREQUENT SHOPPER CARD DATABASE 156. CPU 144 then updates the EARNED DISCOUNT field 172 for the next customer record R2 in accordance with Steps S6-3 through S6-6. Steps S6-3 to S6-7 are repeated until all of the customer records of the FREQUENT SHOPPER CARD DATABASE 156 are updated, at which time the update of the database 156 is complete.

Accordingly, by performing the steps of FIG. 6, the earned discount defined in the EARNED DISCOUNT field 172 of each customer record R1–R3 is updated.

It should be noted that while the reward to the loyal customer is a discount applied to the customer's current transaction, the present invention is not so limited. To the contrary, the present invention contemplates that the discount may be in the form of a dollars off each transaction with the amount of dollars off increasing with continued loyalty to the retail establishment. Further, instead of the reward being a discount to the customer's transaction, the reward may be in other forms unrelated to the purchase or retail establishment, such as frequent flier miles, free time for long distance calling, or other reward incentives.

It should be further noted that while the discount is applied to the entire transaction, the present invention contemplates that the earned discount may be applied to a specific item purchased. For example, the discount system may reward a customer's loyalty to a brand of product. If the customer purchases a defined product within a pre-defined time period, the customer discount is incremented. The customer's discount on the product will continue to be incremented to a maximum discount value, provided the customer purchases the product within each successive pre-defined time period. If the purchaser fails to purchase the product in the pre-defined time period, the discount may be reset to zero percent.

Referring now to FIG. 7, therein is a database table 176 for storing records R1–R3 relating to a customer's loyalty to a particular product that is an alternative embodiment of the table 162 of FIG. 4, as described above. Table 176 has a column and row arrangement whereby columns define fields and rows define records R1–R3 stored according to the fields defined by the columns. In table 176 there are seven columns. Such columns store data related to ACCOUNT NUMBER 164, CUSTOMER NAME 166, CUSTOMER ADDRESS 168, CUSTOMER TELEPHONE NUMBER 170, EARNED DISCOUNT 172, DATE LAST USED 174, and DISCOUNT ITEMS 178.

Database table 176 includes the columns of the table 162 of FIG. 4, and table 176 further includes an additional field 178, DISCOUNT ITEMS, for each record. The DISCOUNT ITEMS field 178 includes the UPC code numeric code to identify the product and the alphanumeric name of the product. The DISCOUNT ITEMS field 178 identifies the product that receives the discount stored in the EARNED DISCOUNT field 172. In table 176 record R1 contains information related to an earned discount for a DISCOUNT ITEMS 178 of DIET PEPSI assigned to a shopper having an ACCOUNT NUMBER 164 of 1234567 among other specified data.

Records R2–R3 have the same record format as record R1 and indicates similar information related to other customers that are identified as frequent shoppers. Accordingly, for purposes of brevity, a detailed review and discussion of records R2 and R3 are omitted.

Figure 9A:
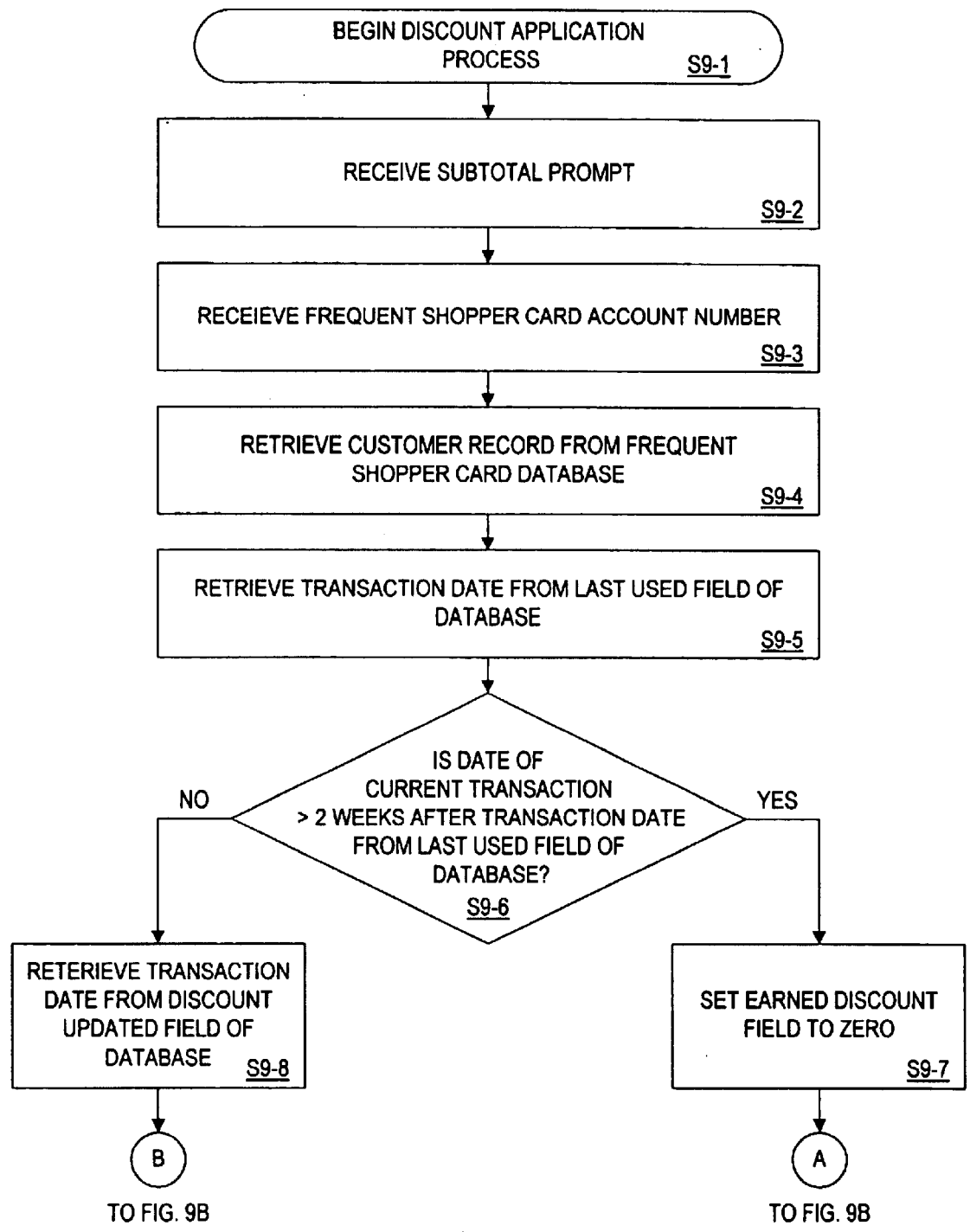
FIGS. 9A–9C are a flowchart that illustrates alternative operations carried out for determining and applying an earned discount to a customer's current purchase, and updating the earned discount of the customer's records stored in the FREQUENT SHOPPER CARD database at the time of purchase according to a preferred embodiment of the present invention.
Figure 9B:
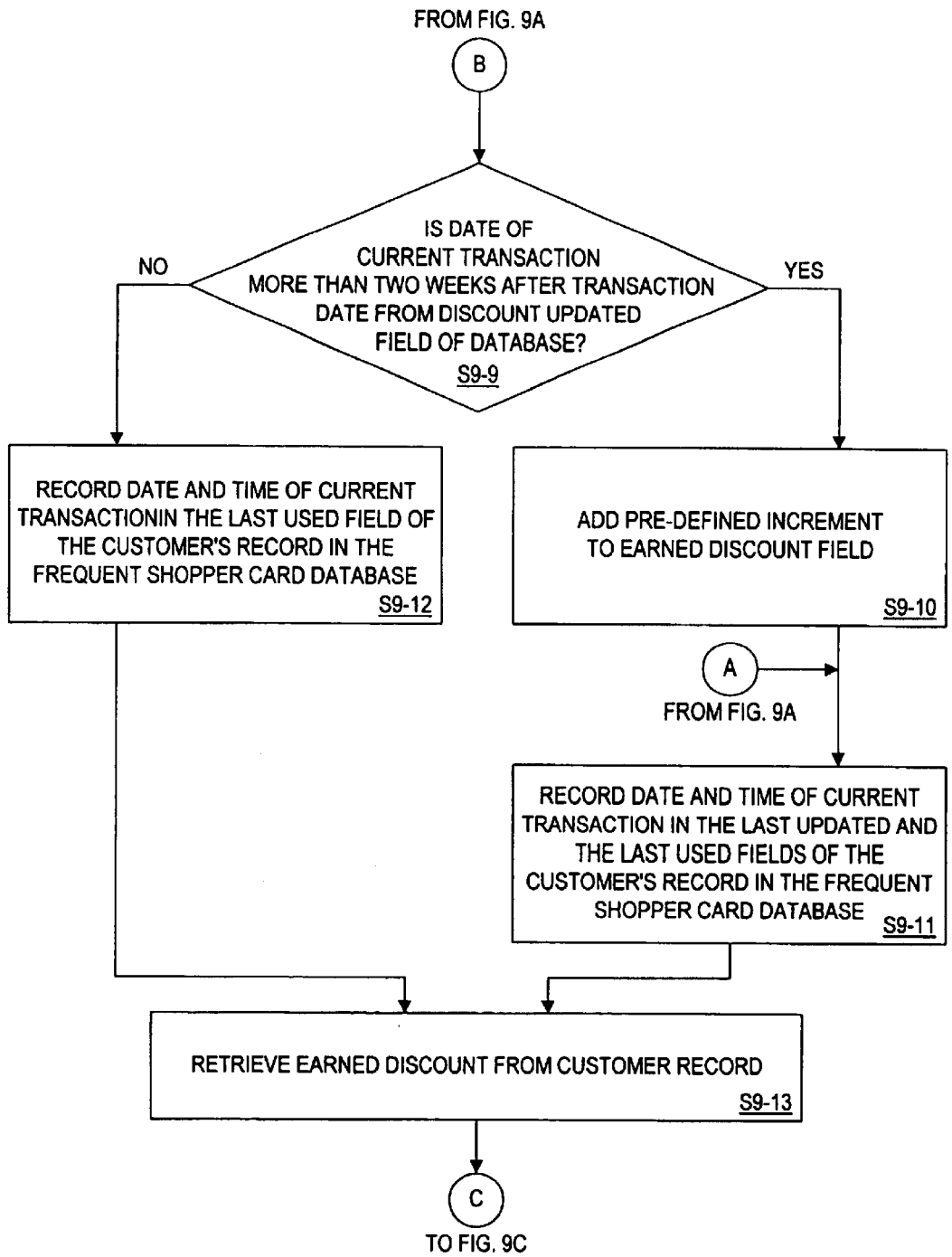
Figure 9C:
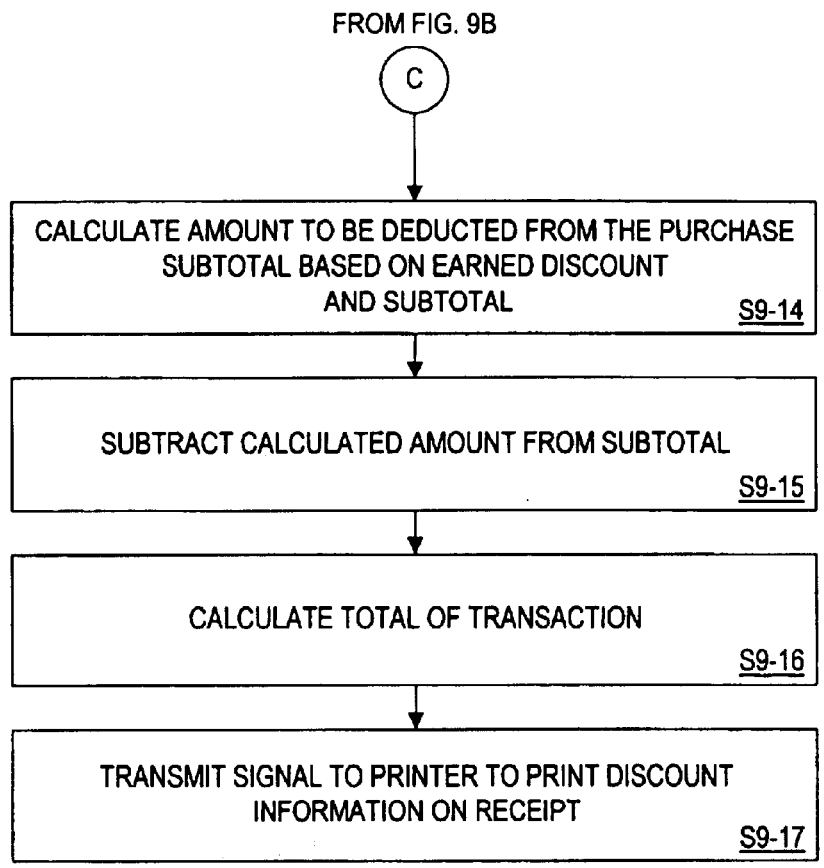

An alternative embodiment to the process of applying the earned discount and updating the FREQUENT SHOPPER CARD DATABASE 156 is depicted in FIGS. 9A–9C. This embodiment updates the FREQUENT SHOPPER CARD DATABASE 156 in real time and thereby eliminates the process of updating all the records R1–R3 of the database 156 at pre-defined time periods, as described in the embodiment of FIGS. 1–6. In other words, the earned discount of each customer record R1–R3 of the database 156 is updated accordingly at the time of each customer transaction. The structure of the system is substantially the same as that shown in FIGS. 1–4. The data storage device 152, shown in FIG. 3, of this embodiment combines the process of the DISCOUNT APPLICATION PROGRAM 158 and the DISCOUNT UPDATE PROGRAM 160. In addition, the database table 180 of FIG. 8 is an alternative embodiment of the table 162 (see FIG. 4) as described hereinabove, except table 180 includes an additional field 182, DISCOUNT UPDATED, for each record R1–R3. The DISCOUNT UPDATED field 182 includes the time and date that the EARNED DISCOUNT field 172 was last changed. The data stored in DISCOUNT UPDATED field 182 provides the measuring period for determining when the earned discount should be changed or remain the same. The importance and function of the data provided in the DISCOUNT UPDATED field 182 will become apparent in the description of the process of the system as shown in the flowcharts of FIG. 9A–9C.

Each record R1–R3 is representative of a customer that has used a Frequent Shopper Card at the retail establishment. Each record R1–R3 maintains the customers present earned discount at field 172, the date and time the customer last purchased goods at the retail establishment at field 174, and the date that the earned discount was last updated at field 182. For example, with regard to record R1, Joe Smith having an ACCOUNT NUMBER of 1234567 presently has an EARNED DISCOUNT of 3.5%, his last purchase at the retail establishment was at 2:43 pm on Jan. 27, 1998, and the EARNED DISCOUNT field was last updated (from 3.0% to 3.5%, assuming an increment of 0.5%) at 8:21 pm on Jan. 14, 1998.

The flowcharts depicted in FIGS. 9A–9C illustrate the process of updating and applying the earned discount of the system shown in FIGS. 1–3 and 7 at the time of the customer's transaction.

With the aforementioned comments in mind, reference is now made to FIG. 9A. Depicted is a flowchart that illustrates the steps of a preferred process performed by a data processing system, such as purchasing system 100, for discounting a customers transaction and updating the customer's earned discount in real time in accordance with the loyalty of the customer to the retail establishment. The computer programming necessary to carry out the functions described below will be readily apparent to those skilled in the art. The flowcharts of FIGS. 9A–9C along with the discussions of the same found herein after are sufficient and adequate to enable one skilled in the art of computer programming to make and use the present invention.

Processing starts at Step S9-1 and immediately proceeds to Step S9-2 and S9-3 where the POS controller 102 receives the subtotal of the customer's transaction, and the account number in field 164 encoded on the Frequent Shopper Card from POS terminal 104.

Thereafter, processing proceeds to Step S9-4, where CPU 144 retrieves the customer record R1, identified by the account number in field 164, from the FREQUENT SHOPPER CARD DATABASE 156.

At Step S9-5, CPU 144 retrieves the transaction date from the LAST USED field 174 of the FREQUENT SHOPPER CARD DATABASE 156.

Thereafter, processing proceeds to Step S9-6, where CPU 144 compares the date of the current transaction with the transaction date from the LAST USED 174 field of the database 156. If the current transaction date is more than a first pre-defined time period (i.e. two weeks) after the transaction date from the LAST USED field 174 of the database, CPU 144 sets the discount from the EARNED DISCOUNT field 172 of the customer's record R1 to zero percent (0%) at Step S9-7. At Step S9-11, the time and date of the current transaction is recorded in the DISCOUNT UPDATED and LAST USED fields 180, 174, respectively, of the customer's record R1 in the FREQUENT SHOPPER CARD DATABASE 156.

At Step S9-6, if the current transaction date is less than the first pre-defined time period after the transaction date from the LAST USED field 174 of the database, the transaction date from the DISCOUNT UPDATED field 182 of the database, at Step S9-8, is retrieved.

At Step S9-9, the date of the current transaction is compared to the transaction date from the DISCOUNT UPDATED field 182 of the FREQUENT SHOPPER CARD DATABASE 156. This step is to determine whether the customer's current transaction is later than a second pre-defined time period (i.e. two weeks) since the last time the EARNED DISCOUNT field 172 has been updated. If so, the customer's discount is incremented. If not, the customer's discount remains the same.

Accordingly, if the current transaction date, at Step S9-9, is later than the second pre-defined period after the transaction date of the DISCOUNT UPDATED field 182, a pre-defined increment, at Step S9-10 is added to the EARNED DISCOUNT field 172 of the database. At Step S9-11, the time and date of the current transaction is recorded in the DISCOUNT UPDATED and LAST USED fields 182, 174, respectively, of the customer's record R1 in the FREQUENT SHOPPER CARD DATABASE 156. This step effectively resets the time period (i.e., two weeks) for updating the earned discount.

At Step S9-9, if the current transaction date is less than the second pre-defined time period (i.e., two weeks) after the transaction date of the DISCOUNT UPDATE field 182 of the database, the EARNED DISCOUNT and DISCOUNT UPDATE fields 182, 174, respectively, remains unchanged, and the time and date of the current transaction is recorded in the LAST USED field 174 of the customer's record R1. in the FREQUENT SHOPPER CARD DATABASE 156.

At Step S9-13 after the EARNED DISCOUNT, DISCOUNT UPDATED and LAST USED fields 172, 174, 182, respectively, of the customer's record R1 is updated, the discount percentage from the EARNED DISCOUNT field of the customer's record is retrieved. At Step S9-14, the dollar amount of the discount is calculated by multiplying the percentage of the earned discount and the subtotal of the current transaction. At Step S9-15, the dollar amount of the discount is subtracted from subtotal of the current transaction and at Step S9-16, the final total of the transaction is calculated, for example by adding any applicable taxes to the discounted subtotal calculated in Step S9-15.

At Step S9-17, POS terminal 104 transmits a signal to printer 116 which in turn prints information relating to the discount to the customer's transaction onto the sales receipt. This information may include the amount of discount, the discounted subtotal, the applicable taxes and the final total of the transaction.

Accordingly, FIGS. 9A–9C illustrate steps that are carried out according to the present invention to discount a loyal customer's purchase in accordance with the discount earned by the customer, and to update the earned discount of each individual customer.

The following description provides an example of the process illustrated in FIGS. 9A–9C in reference to the customer records R1–R3 shown in FIG. 8. First, it is assumed that date of the current transaction is Feb. 1, 1998, the pre-defined time period to update the earned discount is two weeks, and the pre-defined discount increment is 0.5%. For record R1 having an ACCOUNT NUMBER of 1234567, the EARNED DISCOUNT would be increment from 3.0% to 3.5% because Joe Smith's last transaction was less than two weeks ago and the last discount update was longer than two weeks ago. Further, both the DISCOUNT UPDATED and LAST USED fields 182, 174, respectively would be updated to Feb. 1, 1998. For record R2 having an ACCOUNT NUMBER of 1234568, the EARNED DISCOUNT would be reset from 0.5% to 0.0% because Jane Doe's last transaction was more than two weeks ago. Further, both the DISCOUNT UPDATED and LAST USED fields 182, 174, respectively, would be updated to Feb. 1, 1998. For record R3 having an ACCOUNT NUMBER of 1234569, the EARNED DISCOUNT would remain at 1.0% because John Jones' last transaction and the previous discount update were both less than two weeks ago. Further, only the data of the LAST USED field 174 would be updated to Feb. 1, 1998.

Figure 10:
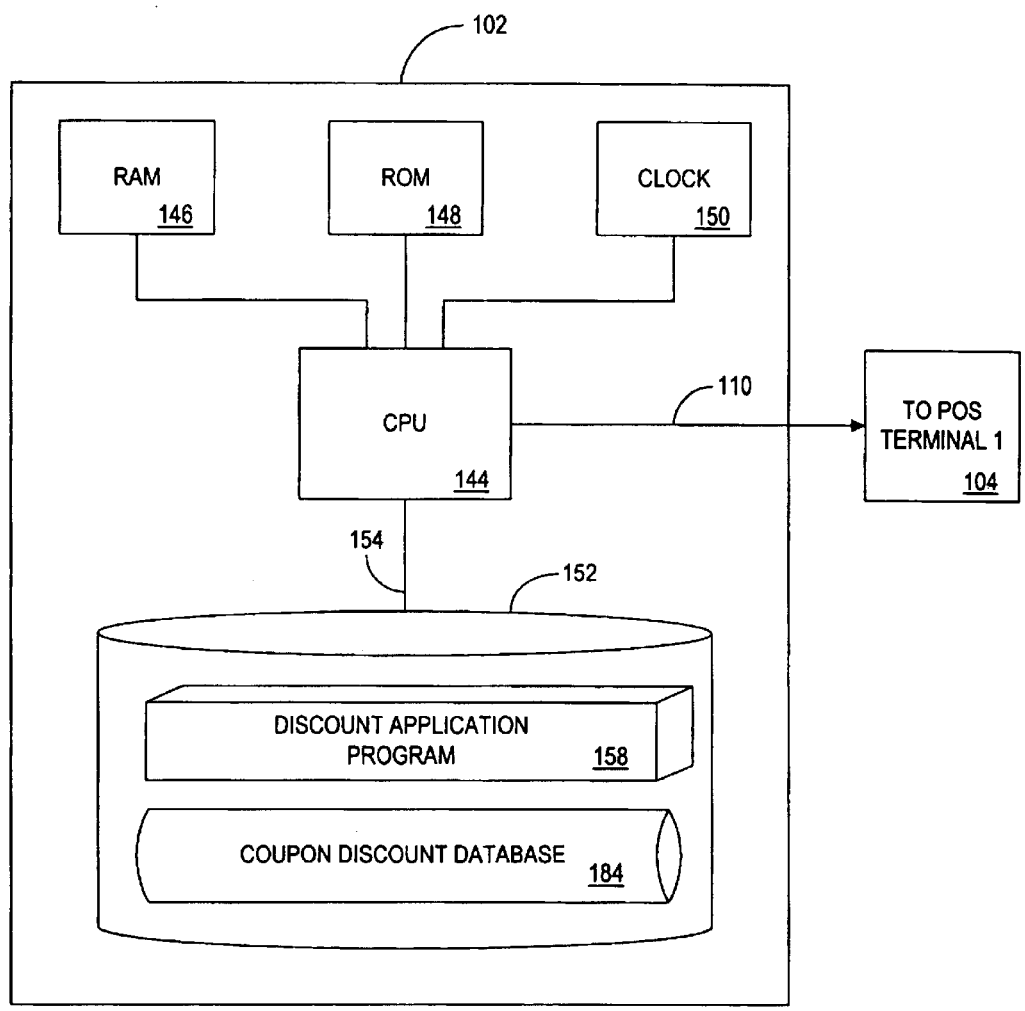
FIG. 10 is a block diagram of another embodiment of a point-of-sale (POS) controller for a progressive discount system configured in accordance with the present invention.
Figure 13:
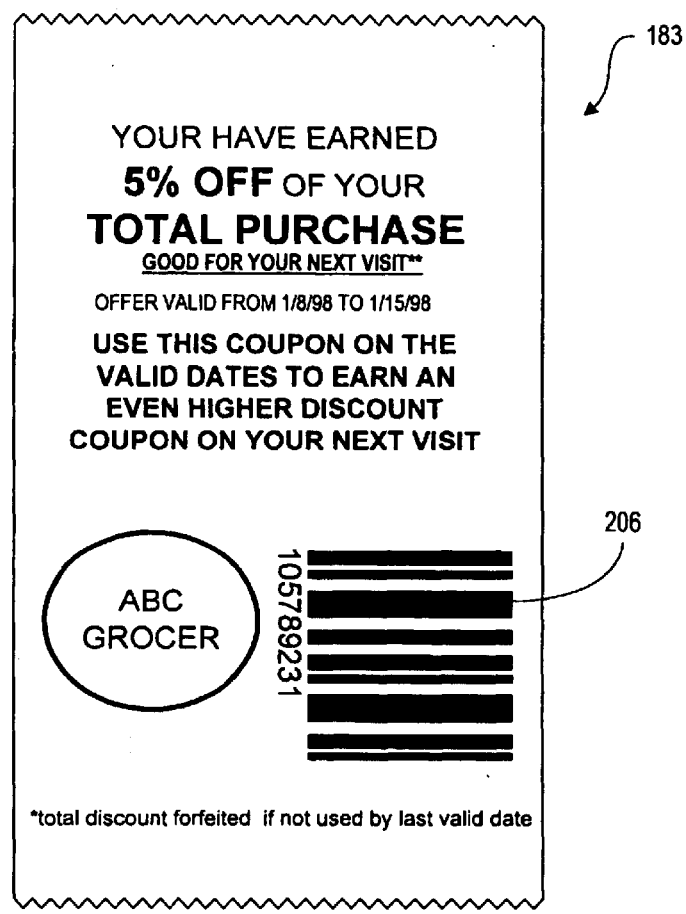
FIG. 13 is a diagram of a discount coupon according to the present invention of FIG. 10.

Another embodiment of the POS Controller 102 of a purchasing system 100 is illustrated in FIG. 10 wherein the discount is offered in the form of a coupon 183 (similar to that shown in FIG. 13). This system 100 eliminates the need to provide a record R1 of each customer as required in the previous embodiments of the present invention. The structural features of the purchasing system 100 that issues discount coupons 183 to loyal customers are substantially similar to the embodiment of the present invention described in connection with FIGS. 1–3, with the exception that the data storage device 152 does not include a FREQUENT SHOPPER CARD DATABASE 156. This embodiment may, however, include a COUPON DISCOUNT DATABASE 184 which records data relating to the issuance and redemption of coupons to track the success of the redemption of the coupons 183.

Referring now to FIG. 11, database table 186 (hereinafter referred to as "table 186") is a preferred implementation of COUPON DISCOUNT DATABASE 184 as originally illustrated in FIG. 10. Table 186 has a column and row arrangement whereby columns define fields and rows define records R1–R6 stored according to the fields defined by the columns. In table 186 there are eight columns shown. The columns store data related to RECORD IDENTIFIER 190, EARNED DISCOUNT 192, ISSUE DATE 194, TOTAL # ISSUED 196, TOTAL # REDEEMED 198, REDEEM DATE 1 200, REDEEM DATE 2 202 and REDEEM DATE N 204. Field REDEEM DATE N 204 is intended to indicate that table 186 may include any number of REDEEM DATE fields. In table 186 record R1, identified by a RECORD IDENTIFIER of "1", contains information related to the coupons 183 issued on Jan. 1, 1998 having an earned discount value of 0.5%.

Each record R1–R6 is representative of the information relating to the redemption and issuance of coupons 183 issued on a given date stored in ISSUE DATE field 194 having a common discount value stored in EARNED DISCOUNT field 192. Each record R1–R6 maintains the total number of coupons 183 issued on the given day, stored in the TOTAL # ISSUED field 196 having a common earned discount value, and the total number of these coupons that were redeemed, stored in the TOTAL # REDEEMED field 198, and the total number of coupons redeemed on each date, stored in the respective REDEEM DATE fields 200, 202, 204. For example, with regard to record R1, thirty-two (32) coupons having a 0.5% discount value were issued on Jan. 1, 1998. Of the thirty-two (32) coupons issued, three (3) coupons were redeemed on date 1, eleven (11) coupons were redeemed on date 2 and zero (0) coupons redeemed on date N.

Records R2–R6 have the same record format as record R1 and indicates similar information relating to the total number of coupons of a specific discount value that were issued on a given day and information relating to the redemption of these coupons. Accordingly, for purposes of brevity, a detailed review and discussion of records R2–R6 is omitted.

Figure 12A:
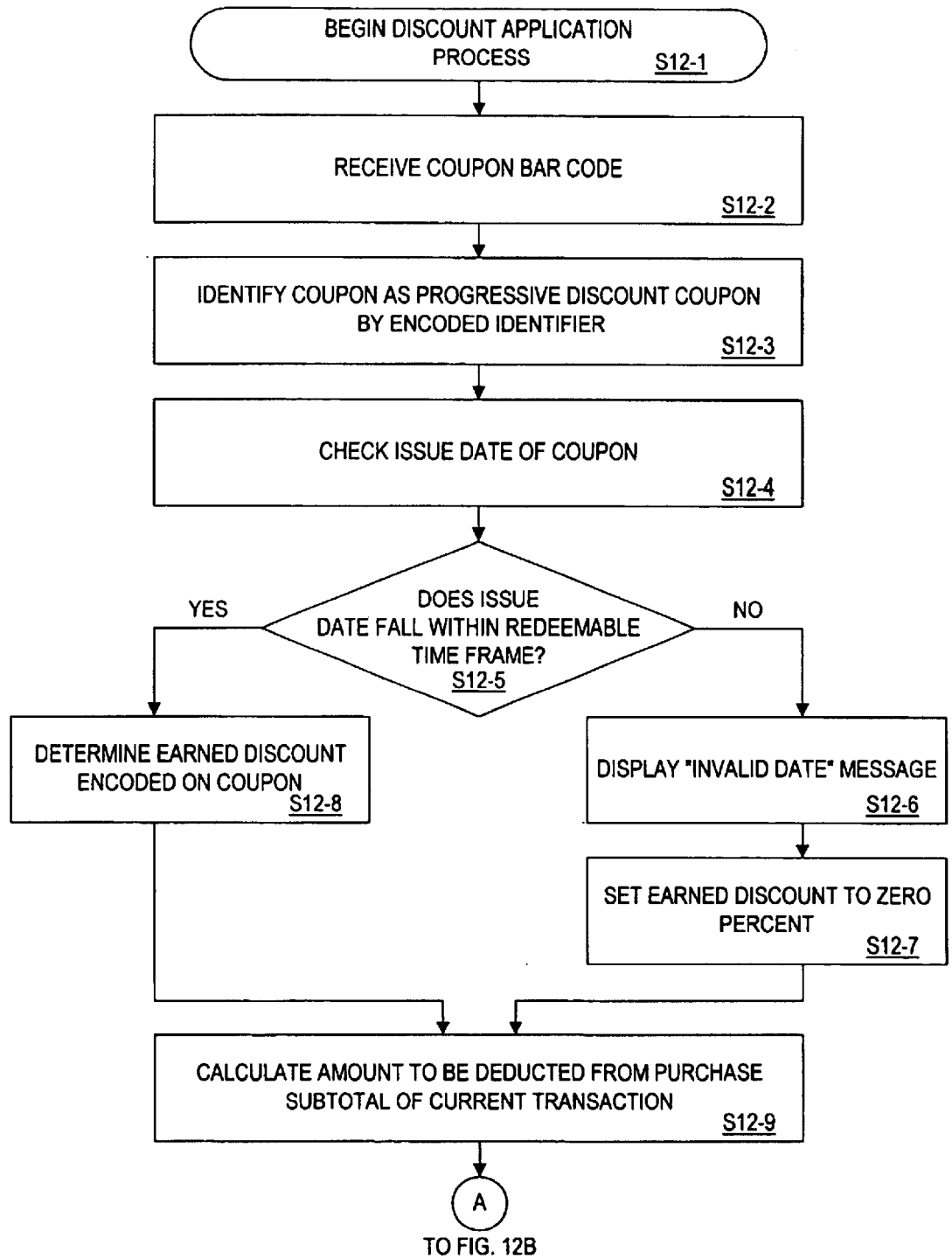
FIGS. 12A–12C are a flowchart that illustrates operations carried out for determining and applying an earned discount provided on a coupon to a customer's current purchase, and updating records stored in the FREQUENT SHOPPER CARD database for tracking the redemption and issuance of discount coupons according to a preferred embodiment of the present invention of FIG. 10.
Figure 12B:
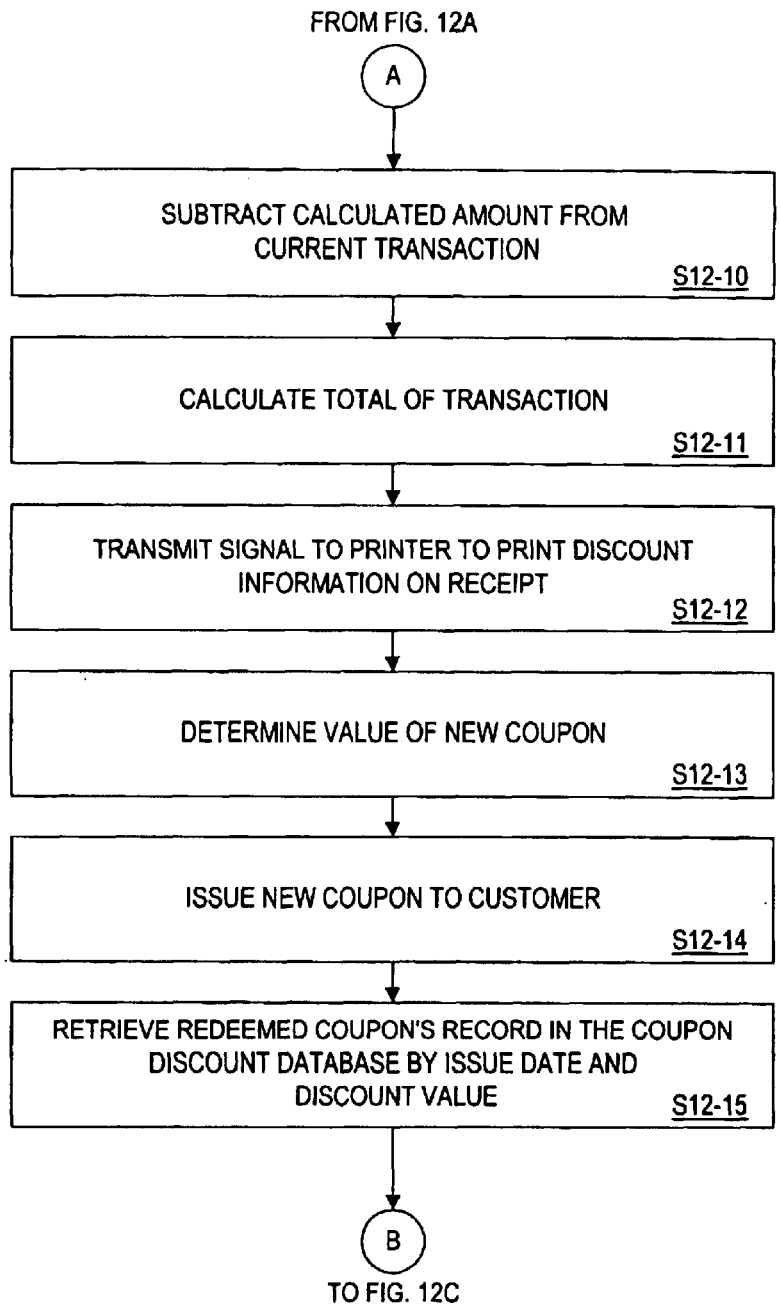
Figure 12C:
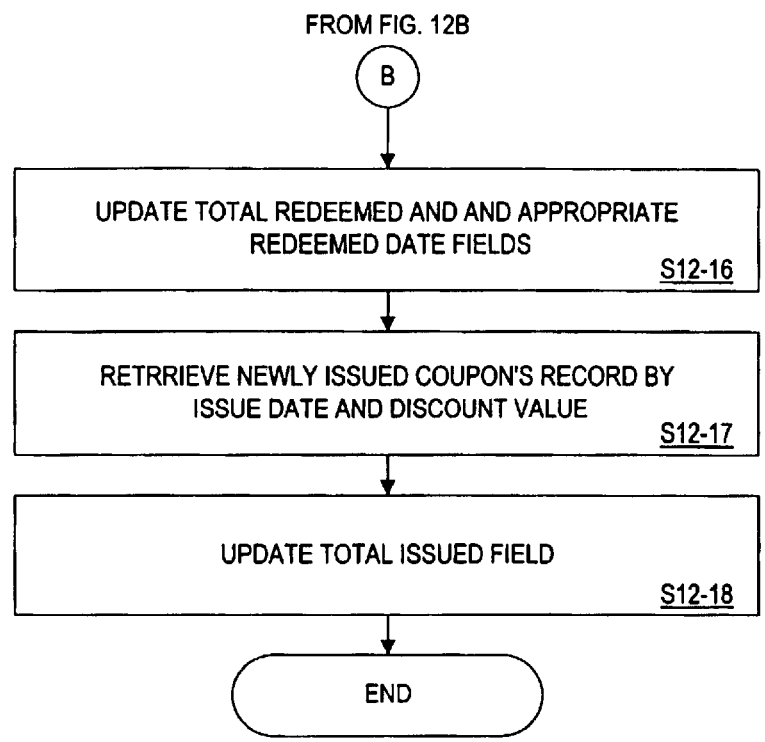

The relationship of table 186 to other data processing systems and databases utilized in the preferred embodiment will be clear from the description regarding FIGS. 12A–12B. It is important to note, however, that the structure and arrangement of table 186, including its columns and fields, may change to suit particular design requirements. Many columns may be included in table 186 to carry out certain functionality and control within a data processing system employing a database table like table 186. Such additions and changes will be apparent to those skilled in the art.

The aforementioned descriptions were concerned with the structural aspects of the preferred embodiments and corresponding components of the present invention. Accordingly, it should be understood that the POS controller 102, POS terminal 104, input device 118 and printer 116 of FIGS. 2 and 10 and the database table 186 illustrated in FIG. 11 operate and function together. The flowcharts depicted in FIGS. 12A and 12B and described below illustrate how such structures operate together. In particular, described below are the steps carried out by purchasing system 100 within a retailer to redeem a discount coupon 183 and issue another wherein the discount value of the new coupon is determined in accordance with the loyalty of the customer to the retail establishment.

With the aforementioned comments in mind, reference is now made to FIG. 12A and 12B. Depicted therein is a flowchart that illustrates the steps of a process performed by a data processing system, such as purchasing system 100 as depicted in FIGS. 2 and 10, for redeeming a discount coupon and issuing a new coupon in accordance with the loyalty of the customer to the retail establishment. The computer programming necessary to carry out many of the functions stated below will be readily apparent to those skilled in the art.

Processing starts at Step S12-1 and immediately proceeds to Step S12-2 where the coupon bar code 206 (described in detail in FIG. 13) is scanned by input device 118 as the coupon 183 is swiped therethrough. Input device 118 then transmits the encoded bar code to POS terminal 104. The POS controller 102 then receives the bar code from POS terminal. In Step S12-3, the POS controller 102 decodes the coupon bar code 206 to identify the coupon 183 as a progressive discount coupon by an encoded identifier.

Thereafter, processing proceeds to Step S12-4, where CPU 144 retrieves the issue date of the coupon 183 provided in the bar code on the coupon, and, in Step S2-5 compares the issue date of the coupon with the present transaction date. If the time period therebetween is greater than a pre-defined time period (i.e., 2 weeks), the coupon, at Step S12-6, is deemed to have expired and a message is provided to the customer. At Step S12-7, the earned discount is set to zero percent.

If the determined time period is within the pre-defined time period, the earned discount that is encoded on the coupon 183 and provided in the bar code 206 is received at Step S12-8.

At Step S12-9, the dollar amount of the discount is calculated by multiplying the percentage of the earned discount and the subtotal of the current transaction provided to POS terminal 104. At Step S12-10, the dollar amount of the discount is subtracted from subtotal of the current transaction, and at Step S12-11, the final total of the transaction is calculated, for example by adding any applicable taxes to the discounted subtotal calculated in Step S12-10.

At Step S12-12, POS terminal 104 transmits a signal to printer 116, which in turn prints information relating to the discount to the customer's transaction onto the sales receipt. This information may include the amount of discount, the discounted subtotal, the applicable taxes and the final total of the transaction.

At Step S12-13, the earned discount value of the new coupon 183 is determined. A process for determining the new coupon value is illustrated in FIGS. 9A–9C at Steps S9-8 to S9-10. The encoded data on the coupon 183 would include a date when the earned discount value of the coupon was last changed, similar to the date stored in the DISCOUNT UPDATED field 182 of Table 180 of FIG. 8. If the time period between the current transaction and the transaction when the earned discount was last changed is greater than a pre-defined time period (e.g., 2 weeks), the earned discount is increased by a pre-determined increment (e.g., 0.5%). If not, the earned discount remains the same as the current coupon value. For expired coupons, the coupon is reset to be a pre-defined discount (e.g., 0.5%).

Another process for determining the earned discount value would be to increase the current earned discount by a predetermined amount each time a coupon is redeemed within a predefined time period. For example, a coupon currently having an earned discount of 2.5% will be increased to 3.0% (assuming the pre-defined amount is 0.5%). For expired coupons, the coupon value of 0.0% would be increased to 0.5%.

At Step S12-14, a new coupon is issued to the customer. The coupon may be a paper form that is issued by a point of pickup unit which may be one similar to an automatic coupon dispensers commonly found in grocery stores. In this way, a customer can immediately receive another coupon for immediate use. Of course, coupons could also be mailed or sent via other communication vehicles such as electronic mail and via the Internet to a particular customer. Furthermore, the coupons could even be printed at the bottom of the sales receipts.

Thereafter, at Step S12-15 the POS controller 102 retrieves the redeemed coupon's record R2 in the COUPON DISCOUNT DATABASE 184 according to the issue date and the discount value of the coupon. For example, referring to FIG. 11, the POS controller 102 would retrieve record R2 having a RECORD IDENTIFIER value of "2" for a redeemed coupon having an EARNED DISCOUNT of 1.0% that was issued on Jan. 1, 1998.

At Step S12-16, the TOTAL # REDEEMED and appropriate REDEEM DATE fields 198, 200, 202, 204, respectively, of the originally issued record are incremented by one. Again using record R2 as an example, TOTAL # ISSUED field 196 and appropriate redeem date (assuming REDEEM DATE 1 200) are incremented from "37" to "38" and from "4" to "5", respectively.

At Step S12-17, the record R6 for the newly issued coupon 183 is retrieved from the COUPON DISCOUNT DATABASE 184 according to the issue date and discount value of the new coupon. For example, POS controller 102 would receive record R6 having a RECORD IDENTIFIER value of "6" for a new coupon and a new earned discount value of 1.0% that was issued on Jan. 2, 1998.

At Step S12-16, the TOTAL # ISSUED field 196 of the newly issued record R6 is incremented by one. Again using record R6 as an example, TOTAL # ISSUED is incremented from "79" to "80". Accordingly, the operations carried out in FIGS. 12A and 12B illustrate the steps that are carried out according to the present invention to discount a loyal customer's purchase in accordance with the discount coupon earned by the customer, and updating and issuing another discount coupon to the customer.

Referring now to FIG. 13, therein depicted is a discount coupon 183 representative of the percentage discount the customer will receive off his next purchase at the retail establishment. In particular, the coupon 183 provides a discount of 5% off the customer's next purchase at ABC grocer, provided the visit is made between the dates of Jan. 8, 1998 and Jan. 15, 1998 along with the incentive that redemption of the coupon within the defined time period will result in an even higher discount. Otherwise, the discount coupon is invalid.

Additionally, the coupon 183 includes an identification number 206 corresponding to the coupon identifier and among other information. That item number may be in the form of a UPC or other bar code, or may be a string of alpha and/or numeric characters that are to be scanned or keyed into an input device. The bar code may include an identifier, the issue date of the coupon, the discount value of the coupon, last date a coupon was used, and the previous date the earned discount value was changed. This type of information could be encoded using the UCC/EAN code 128. Code 128 is a bar code that uses various compression techniques and is capable of encoding the full ASCII character set and encoding data can be of any length. Alternatively, the information on the coupon may be encoded using a two-dimensional ("2D") bar code format. The 2D bar code format enables a substantial amount of information to be provided on the coupon in a very small area.

The embodiment of the present invention illustrated by FIGS. 10–13 provides a coupon including the data used to apply a discount and issue a new coupon in accordance with the date of the customer's last visit. One skilled in the art, however, will appreciate that the data encoded (i.e., identifier, discount, issue date, etc.) on the coupon may be stored within an alternate embodiment of the FREQUENT SHOPPER CARD DATABASE as shown in FIGS. 4, 7 and 8. In this alternative, the coupon may simply include an identifier, such as an account number, to retrieve a customer's record in the database. The identifier may be a pointer which is used to access the appropriate record in the database.

The POS controller 102 then retrieves and updates the data stored in the record identified by the coupon. The coupon value (earned discount) for all records may be simultaneously updated periodically, as illustrated in FIG. 6, or each coupon value may be updated individually at the time of each customer's visit as illustrated in FIGS. 9A–9C.

Figure 14:
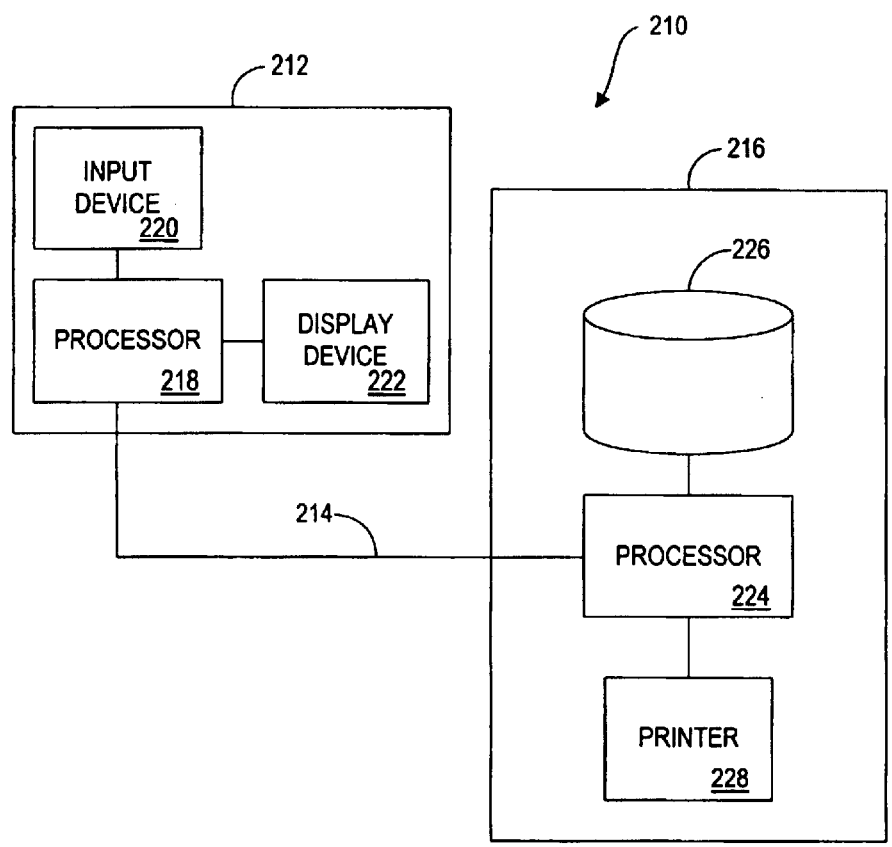
FIG. 14 is a block diagram of an alternative embodiment of a point-of-sale (POS) terminal configured in accordance with a preferred embodiment of the present invention.

Referring to FIG. 14, another embodiment of a POS terminal 210 includes a control device 212 which is in communication via a communication medium 214 with a system 216 for printing receipts and/or coupons. The control device 212 comprises a processor 218 that is in communication with an input device 220 and a display device 222. The system 216 for printing comprises a processor 224 in communication with a storage device 226 and a printer 228. In this embodiment, the control device 212 may be a cash register, and the system 216 may be an electronic device for printing coupons in accordance with data received from the cash register. Other configurations of POS terminals will be understood by those skilled in the art.

Accordingly, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A method for determining a discount, the method comprising:
   receiving a customer identifier that indicates a customer;
   determining a previous purchase associated with the customer and a time of the previous purchase;
   determining a first discount associated with the customer and a time of the first discount;
   determining a current transaction associated with the customer and a time of the current transaction;
   determining a first difference between the time of the current transaction and the time of the previous purchase;

determining a second difference between the time of the current transaction and the time of the first discount;

determining a second discount based on whether the first difference is less than a predetermined minimum transaction period and whether the second difference is greater than a predetermined discount adjustment period; and providing the second discount to the customer.

2. A method for determining a discount, the method comprising:

receiving a customer identifier that indicates a customer;

determining a previous purchase associated with the customer and a time of the previous purchase;

determining a first discount associated with the customer and a time of the first discount;

determining a current transaction associated with the customer and a time of the current transaction;

determining a first difference between the time of the current transaction and the time of the previous purchase;

determining a second difference between the time of the current transaction and the time of the first discount;

determining, on a data processing device, a second discount based on whether the first difference is less than a predetermined minimum transaction period and whether the second difference is greater than a predetermined discount adjustment period; and providing the second discount to the customer.

3. The method of claim 2, further comprising: applying the second discount to the current transaction.

4. The method of claim 2, further comprising: applying the second discount to a future transaction associated with the customer.

5. The method of claim 2, in which determining a second discount further is based on the first discount.

6. The method of claim 2, in which determining a second discount further is based on a predefined value.

7. The method of claim 6, in which determining a second discount further is based on increasing the first discount by the predefined value.

8. The method of claim 2, in which determining a second discount further comprises: increasing the first discount by a predefined value, if the first difference is less than the predetermined minimum transaction period and the second difference is greater than the predetermined discount adjustment period.

9. The method of claim 2, in which determining the second discount further comprises:

decreasing the first discount by a predefined value, if the first difference is not less than the predetermined minimum transaction period.

10. The method of claim 2, in which determining a second discount further comprises:

setting the second discount equal to the first discount, if the difference is less than the predetermined minimum transaction period and the second difference is not greater than the predetermined discount adjustment period.

11. A method for determining a discount, the method comprising:

receiving a customer identifier that indicates a customer;

determining a previous purchase associated with the customer and a time of the previous purchase;

determining a first discount associated with the customer and a time of the first discount;

determining a current transaction associated with the customer and a time of the current transaction;

determining a first difference between the time of the current transaction and the time of the previous purchase;

determining a second difference between the time of the current transaction and the time of the first discount;

determining a second discount based on whether the first difference is less than a predetermined minimum transaction period and whether the second difference is greater than a predetermined discount adjustment period; and exchanging at least one item for a payment amount that is based on the second discount.

* * * * *